(12) United States Patent
Altfeld et al.

(10) Patent No.: US 9,709,331 B2
(45) Date of Patent: Jul. 18, 2017

(54) PLANT AND METHOD FOR THE PRODUCTION OF CEMENT CLINKER

(75) Inventors: Jochen Altfeld, Münster (DE); Ralf Osburg, Beckum (DE); Tobias Klegraf, Rüthen (DE); Christoph Beyer, Münster (DE); Markus Mohr, Dülmen (DE); Karl Lampe, Ennigerloh (DE); Sebastian Frie, Münster (DE)

(73) Assignee: THYSSENKRUPP POLYSIUS AKTIENGESELLSCHAFT, Beckum (DE)

( * ) Notice: Subject to any disclaimer, the term of this patent is extended or adjusted under 35 U.S.C. 154(b) by 2504 days.

(21) Appl. No.: 12/092,297

(22) PCT Filed: Oct. 30, 2006

(86) PCT No.: PCT/EP2006/010432
§ 371 (c)(1),
(2), (4) Date: Oct. 10, 2008

(87) PCT Pub. No.: WO2007/051585
PCT Pub. Date: May 10, 2007

(65) Prior Publication Data
US 2009/0305180 A1   Dec. 10, 2009

(30) Foreign Application Priority Data

Nov. 4, 2005 (DE) .................. 10 2005 052 753
Feb. 15, 2006 (EP) .................... 06003079

(51) Int. Cl.
| | |
|---|---|
| *F27D 15/02* | (2006.01) |
| *F27B 7/20* | (2006.01) |
| *C04B 7/43* | (2006.01) |

(52) U.S. Cl.
CPC ........... *F27B 7/2033* (2013.01); *C04B 7/434* (2013.01)

(58) Field of Classification Search
CPC ............................. C04B 7/434; F27B 7/2033
(Continued)

(56) References Cited

U.S. PATENT DOCUMENTS 274,288 A * 3/1883 de Smedt ................. 106/758
786,599 A * 4/1905 Repath et al. ............ 432/129
(Continued)

FOREIGN PATENT DOCUMENTS

| DE | 10 2004 009689 | 9/2005 |
|---|---|---|
| GB | 2 009 900 | 12/1978 |
| JP | 01 260205 | 10/1989 |

*Primary Examiner* — Eric Stapleton
(74) *Attorney, Agent, or Firm* — Dinsmore & Shohl LLP

(57) ABSTRACT

The invention relates to a plant and to a method for the production of cement clinker from cement raw meal, the cement raw meal being preheated in a preheating zone, precalcined in a calcining zone, completely burned in a sintering combustion zone and cooled in a cooling zone, solid fuels additionally being burned in an additional combustion region, a firing region being used in the additional combustion region, the solid fuel being introduced into the firing region where it forms a fuel bed over which a supplied oxygen-containing gas flows, the resulting combustion products being removed via a discharge opening and being used in the production of cement clinker. The fuel is supplied via a conveyor device arranged outside the firing region, in such a manner that it moves the fuel bed that is present in the direction towards the discharge opening.

16 Claims, 12 Drawing Sheets

Figure 1:
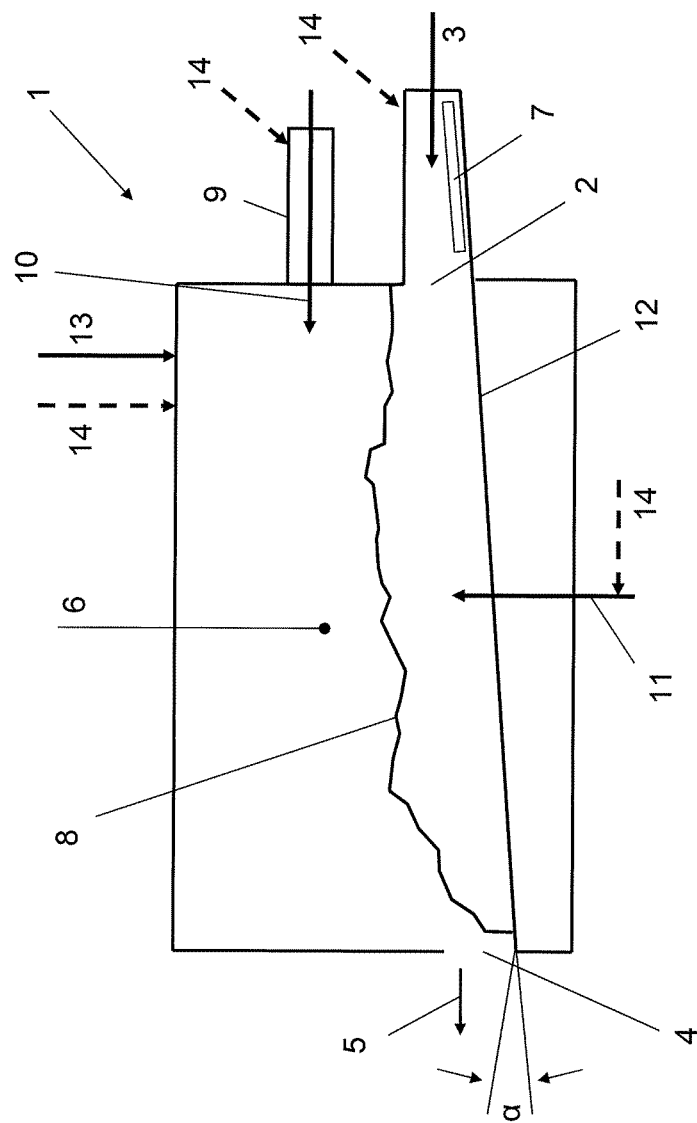

(58) Field of Classification Search
USPC .......... 432/1, 14, 58, 77; 106/739; 110/209, 110/231, 283
See application file for complete search history.

(56) References Cited

U.S. PATENT DOCUMENTS

| | | | | |
|---|---|---|---|---|
| 1,018,976 A * | 2/1912 | Kenney et al. | ............... | 110/283 |
| 1,128,199 A * | 2/1915 | Thomas et al. | ............... | 110/231 |
| 1,132,527 A * | 3/1915 | Schneider | ............... | 106/754 |
| 1,323,294 A * | 12/1919 | Lesley | ............... | 106/758 |
| 1,372,267 A * | 3/1921 | Blackburn et al. | ............... | 110/289 |
| 1,380,844 A * | 6/1921 | Schmidt | ............... | 110/182.5 |
| 1,444,927 A * | 2/1923 | Leggo | ............... | 432/129 |
| 1,446,863 A * | 2/1923 | Townley et al. | ............... | 432/32 |
| 1,454,697 A * | 5/1923 | Wightman | ............... | 110/277 |
| 1,664,082 A * | 3/1928 | Mildon | ............... | 110/291 |
| 1,746,944 A * | 2/1930 | Hyde | ............... | 106/754 |
| 1,772,021 A * | 8/1930 | Whitney | ............... | 110/269 |
| 1,811,920 A * | 6/1931 | Dickson | ............... | 423/110 |
| 1,904,699 A * | 4/1933 | Singmaster | ............... | 106/754 |
| 1,953,335 A * | 4/1934 | Burton et al. | ............... | 110/286 |
| 1,989,809 A * | 2/1935 | Kohout | ............... | 110/163 |
| 1,991,841 A * | 2/1935 | Burton | ............... | 110/286 |
| 2,005,005 A * | 6/1935 | Preston | ............... | 110/289 |
| 2,007,028 A * | 7/1935 | Taylor | ............... | 122/4 C |
| 2,020,026 A * | 11/1935 | Gilpin | ............... | 110/288 |
| 2,034,890 A * | 3/1936 | Wynn, Jr. | ............... | 110/288 |
| 2,070,166 A * | 2/1937 | Harrison | ............... | 110/182.5 |
| 2,090,363 A * | 8/1937 | Wendeborn | ............... | 106/754 |
| 2,090,868 A * | 8/1937 | Hyde | ............... | 106/749 |
| 2,104,526 A * | 1/1938 | Raisch | ............... | 110/225 |
| 2,123,163 A * | 7/1938 | Birkenbeuel | ............... | 110/162 |
| 2,125,054 A * | 7/1938 | Stevenson | ............... | 110/288 |
| 2,141,764 A * | 12/1938 | Riddell | ............... | 110/288 |
| 2,194,025 A * | 3/1940 | Halfdan | ............... | 126/110 R |
| 2,333,111 A * | 11/1943 | Lykken | ............... | 266/140 |
| 2,343,336 A * | 3/1944 | Somes | ............... | 75/403 |
| 2,347,819 A * | 5/1944 | Foresman | ............... | 122/4 R |
| 2,348,762 A * | 5/1944 | Sturtevant | ............... | 110/190 |
| 2,358,993 A * | 9/1944 | Mosshart | ............... | 122/4 R |
| 2,365,194 A * | 12/1944 | Hodson et al. | ............... | 75/363 |
| 2,367,799 A * | 1/1945 | Robinson | ............... | 110/191 |
| 2,376,177 A * | 5/1945 | Nichols, Jr. | ............... | 75/483 |
| 2,385,027 A * | 9/1945 | Preston | ............... | 110/280 |
| 2,392,340 A * | 1/1946 | Smith | ............... | 110/290 |
| 2,421,902 A * | 6/1947 | Neuschotz | ............... | 432/58 |
| 2,496,203 A * | 1/1950 | Flint et al. | ............... | 252/378 P |
| 2,497,628 A * | 2/1950 | Quist | ............... | 110/288 |
| 2,498,710 A * | 2/1950 | Roetheli | ............... | 423/177 |
| 2,503,788 A * | 4/1950 | White | ............... | 422/145 |
| 2,505,617 A * | 4/1950 | Gordon | ............... | 432/58 |
| 2,656,799 A * | 10/1953 | Hatton | ............... | 110/101 CB |
| 2,746,735 A * | 5/1956 | Bradford | ............... | 432/58 |
| 2,750,182 A * | 6/1956 | Petersen | ............... | 432/58 |
| 2,756,981 A * | 7/1956 | Muller | ............... | 432/58 |
| 2,763,478 A * | 9/1956 | Parry | ............... | 432/58 |
| 2,991,187 A * | 7/1961 | Sellers et al. | ............... | 106/757 |
| 3,030,089 A * | 4/1962 | Johnson, Jr. | ............... | 432/15 |
| 3,118,658 A * | 1/1964 | Dennert | ............... | 432/58 |
| 3,127,455 A * | 3/1964 | Culbertson, Jr. et al. | ............... | 106/744 |
| 3,135,618 A * | 6/1964 | Friese | ............... | 106/764 |
| 3,142,480 A * | 7/1964 | Azbe | ............... | 432/79 |
| 3,153,633 A * | 10/1964 | Von Dreusche, Jr. | ............... | 502/47 |
| 3,210,180 A * | 10/1965 | Jukkola | ............... | 423/148 |
| 3,285,590 A * | 11/1966 | Parsons | ............... | 432/14 |
| 3,355,158 A * | 11/1967 | Campbell et al. | ............... | 432/79 |
| 3,357,689 A * | 12/1967 | Basen et al. | ............... | 414/149 |
| 3,716,387 A * | 2/1973 | Simmons et al. | ............... | 106/750 |
| 3,863,577 A * | 2/1975 | Steever et al. | ............... | 110/245 |
| 3,881,862 A * | 5/1975 | Nishida et al. | ............... | 432/106 |
| 3,884,620 A * | 5/1975 | Rammler | ............... | 432/15 |
| 3,887,326 A * | 6/1975 | Townley | ............... | 432/14 |
| 3,905,757 A * | 9/1975 | von Dreusche, Jr. | ............... | 432/18 |
| 3,969,069 A * | 7/1976 | Knaak | ............... | 432/25 |
| 3,975,148 A * | 8/1976 | Fukuda et al. | ............... | 432/106 |
| 4,004,938 A * | 1/1977 | Rohrbach et al. | ............ | 106/760 |
| 4,022,626 A * | 5/1977 | McBee et al. | ............... | 106/18.33 |
| 4,022,629 A * | 5/1977 | Garrett et al. | ............... | 106/757 |
| 4,050,882 A * | 9/1977 | Kohl et al. | ............... | 432/14 |
| 4,081,285 A * | 3/1978 | Pennell | ............... | 106/740 |
| 4,110,121 A * | 8/1978 | Rechmeier et al. | ............... | 106/745 |
| 4,118,177 A * | 10/1978 | Weber et al. | ............... | 432/14 |
| 4,123,288 A * | 10/1978 | Stringer et al. | ............... | 106/745 |
| 4,152,110 A * | 5/1979 | Jukkola et al. | ............... | 432/14 |
| 4,179,263 A * | 12/1979 | Jung et al. | ............... | 588/321 |
| 4,226,586 A * | 10/1980 | Brachthauser et al. | ............ | 432/106 |
| 4,236,886 A * | 12/1980 | Ansen et al. | ............... | 432/14 |
| 4,238,237 A * | 12/1980 | Jarrett et al. | ............... | 106/757 |
| 4,248,639 A * | 2/1981 | Quittkat | ............... | 106/759 |
| 4,256,503 A * | 3/1981 | Tsuda et al. | ............... | 106/745 |
| 4,265,670 A * | 5/1981 | Brachthauser et al. | ............ | 106/756 |
| 4,285,283 A * | 8/1981 | Lyon et al. | ............... | 110/347 |
| 4,295,823 A * | 10/1981 | Ogawa et al. | ............... | 432/106 |
| 4,295,825 A * | 10/1981 | Chielens et al. | ............... | 432/116 |
| 4,299,177 A * | 11/1981 | Mros | ............... | 110/101 CF |
| 4,310,298 A * | 1/1982 | Abelitis | ............... | 432/14 |
| 4,315,734 A * | 2/1982 | Ramesohl et al. | ............... | 432/14 |
| 4,318,691 A * | 3/1982 | Strong | ............... | 432/58 |
| 4,321,032 A * | 3/1982 | Brice et al. | ............... | 432/14 |
| 4,324,544 A * | 4/1982 | Blake | ............... | 432/14 |
| 4,326,845 A * | 4/1982 | Hess | ............... | 432/106 |
| 4,333,766 A * | 6/1982 | Moisset et al. | ............... | 106/746 |
| 4,337,030 A * | 6/1982 | Gootzait et al. | ............... | 432/14 |
| 4,352,660 A * | 10/1982 | Steiner et al. | ............... | 432/14 |
| 4,352,661 A * | 10/1982 | Crookston et al. | ............... | 432/14 |
| 4,363,668 A * | 12/1982 | Herchenbach | ............... | 106/771 |
| 4,392,353 A * | 7/1983 | Shibuya et al. | ............... | 60/657 |
| 4,397,248 A * | 8/1983 | Mehta et al. | ............... | 110/263 |
| 4,402,275 A * | 9/1983 | Weiner et al. | ............... | 110/347 |
| 4,420,302 A * | 12/1983 | Knudsen | ............... | 432/14 |
| 4,431,407 A * | 2/1984 | Beckenbach et al. | ............ | 432/99 |
| 4,431,453 A * | 2/1984 | Feige et al. | ............... | 106/761 |
| 4,431,454 A * | 2/1984 | Krennbauer | ............... | 106/762 |
| 4,452,584 A * | 6/1984 | Beckenbach et al. | ............ | 432/14 |
| 4,453,474 A * | 6/1984 | Lewis | ............... | 110/188 |
| 4,462,794 A * | 7/1984 | Pfeffer et al. | ............... | 432/14 |
| 4,473,352 A * | 9/1984 | Sonoda et al. | ............... | 432/96 |
| 4,478,572 A * | 10/1984 | Selli | ............... | 432/13 |
| 4,487,577 A * | 12/1984 | Watson | ............... | 432/37 |
| 4,497,761 A * | 2/1985 | Schulte | ............... | 264/658 |
| 4,600,438 A * | 7/1986 | Harris | ............... | 106/757 |
| 4,627,877 A * | 12/1986 | Ogawa et al. | ............... | 106/745 |
| 4,640,681 A * | 2/1987 | Steinbiss et al. | ............... | 432/14 |
| 4,662,841 A * | 5/1987 | Zeisel | ............... | 432/14 |
| 4,678,514 A * | 7/1987 | Deyhle et al. | ............... | 106/745 |
| 4,720,262 A * | 1/1988 | Durr et al. | ............... | 432/106 |
| 4,723,093 A * | 2/1988 | Nolan | ............... | 313/643 |
| 4,740,157 A * | 4/1988 | D'Agrosa | ............... | 432/14 |
| 4,747,773 A * | 5/1988 | Predescu et al. | ............... | 432/14 |
| 4,764,107 A * | 8/1988 | Sundermann et al. | ............ | 432/96 |
| 4,797,091 A * | 1/1989 | Neumann | ............... | 432/14 |
| 4,808,108 A * | 2/1989 | Tiggesbaumker et al. | ............ | 432/14 |
| 4,815,398 A * | 3/1989 | Keating et al. | ............... | 110/233 |
| 4,815,970 A * | 3/1989 | Unland et al. | ............... | 432/106 |
| 4,846,083 A * | 7/1989 | Serbent | ............... | 110/346 |
| 4,850,290 A * | 7/1989 | Benoit et al. | ............... | 110/346 |
| 4,863,702 A * | 9/1989 | Galloway et al. | ............... | 422/111 |
| 4,881,862 A * | 11/1989 | Dick | ............... | 414/218 |
| 4,886,448 A * | 12/1989 | Schurmann et al. | ............ | 432/99 |
| 4,889,640 A * | 12/1989 | Stanforth | ............... | 405/129.25 |
| 4,894,983 A * | 1/1990 | Schmid | ............... | 57/408 |
| 4,921,538 A * | 5/1990 | Lafser et al. | ............... | 106/745 |
| 4,922,889 A * | 5/1990 | Nuesmeyer et al. | ............... | 126/73 |
| 4,929,178 A * | 5/1990 | Maury et al. | ............... | 432/14 |
| 4,950,409 A * | 8/1990 | Stanforth | ............... | 405/129.25 |
| 4,956,158 A * | 9/1990 | Nguyen et al. | ............... | 423/111 |
| 4,964,914 A * | 10/1990 | Leath | ............... | 106/745 |
| 4,984,983 A * | 1/1991 | Enkegaard | ............... | 432/14 |
| 5,052,874 A * | 10/1991 | Johanson | ............... | 414/326 |
| 5,083,516 A * | 1/1992 | Benoit et al. | ............... | 110/346 |
| 5,086,716 A * | 2/1992 | Lafser, Jr. | ............... | 110/345 |
| 5,110,288 A * | 5/1992 | Rothschild et al. | ............ | 432/96 |
| 5,122,189 A * | 6/1992 | Garrett et al. | ............... | 106/745 |
| 5,156,676 A * | 10/1992 | Garrett et al. | ............... | 106/745 |

(56) References Cited

U.S. PATENT DOCUMENTS

| | | | | |
|---|---|---|---|---|
| 5,161,315 | A * | 11/1992 | Long | 34/580 |
| 5,164,174 | A * | 11/1992 | Banker et al. | 588/316 |
| 5,165,888 | A * | 11/1992 | Rothschild et al. | 432/14 |
| 5,170,726 | A * | 12/1992 | Brashears et al. | 110/236 |
| 5,173,044 | A * | 12/1992 | Neilsen | 432/14 |
| 5,176,087 | A * | 1/1993 | Noland et al. | 110/346 |
| 5,176,513 | A * | 1/1993 | Zinn et al. | 432/58 |
| 5,199,987 | A * | 4/1993 | Ernstbrunner | 106/761 |
| 5,217,624 | A * | 6/1993 | Yamane et al. | 405/129.3 |
| 5,220,874 | A * | 6/1993 | Keating et al. | 110/246 |
| 5,224,433 | A * | 7/1993 | Benoit et al. | 110/346 |
| 5,377,603 | A * | 1/1995 | Reese et al. | 110/346 |
| 5,421,880 | A * | 6/1995 | Young | 106/756 |
| 5,425,792 | A * | 6/1995 | Bishop et al. | 48/197 R |
| 5,437,721 | A * | 8/1995 | Kupper et al. | 106/739 |
| 5,451,255 | A * | 9/1995 | Hansen et al. | 106/743 |
| 5,468,327 | A * | 11/1995 | Pawlowicz et al. | 156/393 |
| 5,494,515 | A * | 2/1996 | Young | 106/756 |
| RE35,251 | E * | 5/1996 | van den Broek | 110/221 |
| 5,536,371 | A * | 7/1996 | Verhoff | 162/189 |
| 5,586,510 | A * | 12/1996 | Leonard et al. | 110/345 |
| 5,641,327 | A * | 6/1997 | Leas | 48/197 R |
| 5,656,044 | A * | 8/1997 | Bishop et al. | 48/197 R |
| 5,707,230 | A * | 1/1998 | Kiss | 432/238 |
| 5,724,899 | A * | 3/1998 | Reese et al. | 110/346 |
| 5,816,795 | A * | 10/1998 | Hansen et al. | 432/14 |
| 5,851,246 | A * | 12/1998 | Bishop et al. | 48/122 |
| 5,906,194 | A * | 5/1999 | Wedel | 126/152 B |
| 5,954,499 | A * | 9/1999 | Jessen | 432/106 |
| 5,992,041 | A * | 11/1999 | McClaine et al. | 34/178 |
| 6,050,203 | A * | 4/2000 | Reese et al. | 110/246 |
| 6,050,813 | A * | 4/2000 | Doumet | 432/106 |
| 6,142,771 | A * | 11/2000 | Doumet | 432/14 |
| 6,176,187 | B1 * | 1/2001 | Leonard et al. | 110/215 |
| 6,183,244 | B1 * | 2/2001 | Doumet | 432/37 |
| 6,287,379 | B1 * | 9/2001 | Khalifeh | 106/745 |
| 6,325,620 | B1 * | 12/2001 | Heinemann | 432/16 |
| 6,383,283 | B1 * | 5/2002 | Doumet | 106/743 |
| 6,391,107 | B1 * | 5/2002 | Reimann et al. | 106/739 |
| 6,416,574 | B1 * | 7/2002 | Steelhammer et al. | 106/751 |
| 6,439,139 | B1 * | 8/2002 | Jones | 110/346 |
| 6,468,075 | B2 * | 10/2002 | Streit et al. | 432/106 |
| 6,491,751 | B1 * | 12/2002 | Watson | 106/756 |
| 6,574,885 | B1 * | 6/2003 | Pospisil et al. | 34/592 |
| 6,647,901 | B2 * | 11/2003 | Somers | 110/109 |
| 6,662,735 | B2 * | 12/2003 | Tischer et al. | 110/342 |
| 6,688,883 | B2 * | 2/2004 | Tseng et al. | 432/105 |
| 6,691,628 | B2 * | 2/2004 | Meyer et al. | 110/345 |
| 6,709,510 | B1 * | 3/2004 | Young et al. | 106/745 |
| 6,764,544 | B2 * | 7/2004 | Oates et al. | 106/763 |
| 6,773,259 | B1 * | 8/2004 | Bech et al. | 432/14 |
| 6,805,554 | B2 * | 10/2004 | Ludger et al. | 432/13 |
| 6,807,916 | B2 * | 10/2004 | Nunemacher | 110/342 |
| 6,814,011 | B2 * | 11/2004 | Saccani | 110/233 |
| 6,854,319 | B2 * | 2/2005 | Nunemacher | 73/46 |
| 6,875,267 | B2 * | 4/2005 | Steffler et al. | 106/739 |
| 7,107,916 | B2 * | 9/2006 | Bland et al. | 110/346 |
| 7,833,012 | B2 * | 11/2010 | Beyer et al. | 432/129 |
| 8,021,479 | B2 * | 9/2011 | Mohr et al. | 106/739 |
| 2005/0274067 | A1 * | 12/2005 | Morton et al. | 44/606 |
| 2008/0118880 | A1 * | 5/2008 | Beyer et al. | 432/14 |
| 2008/0245275 | A1 * | 10/2008 | Mohr et al. | 106/739 |
| 2009/0098498 | A1 * | 4/2009 | Klegraf et al. | 432/106 |
| 2009/0305180 | A1 * | 12/2009 | Altfeld et al. | 432/1 |
| 2011/0126738 | A1 * | 6/2011 | Kupper et al. | 106/743 |
| 2012/0247371 | A1 * | 10/2012 | Stender et al. | 106/761 |

* cited by examiner

PLANT AND METHOD FOR THE PRODUCTION OF CEMENT CLINKER

The invention relates to a plant and to a method for the production of cement clinker from cement raw meal, the cement raw meal being preheated in a preheating zone, precalcined in a calcining zone, completely burned in a sintering combustion zone and cooled in a cooling zone, solid fuels also being burned in an additional combustion region.

Because the production of cement clinker has an enormous energy requirement, it is desirable to find technical solutions for the increased use of solid fuels, especially of solid secondary fuels, which are less expensive compared with primary fuels.

It has already been proposed to provide separate combustion chambers in the calcining zone. The fuel and tertiary air coming from the cooler are thereby introduced into the separate combustion chambers. In addition, a partial amount of the raw meal is added in most cases. Because of the high air speeds, however, the dwell time in such combustion chambers is relatively short, so that they are less suitable in most cases for problematic and/or solid fuels.

In another form, the additional combustion chamber is operated as a rotary kiln. The dwell time of the fuel can be markedly increased thereby, but the technical outlay is complex and expensive.

U.S. Pat. No. 5,954,499 proposes providing an additional combustion region in the lowermost zone of the calcinator. In that publication, the fuel is fed in from the top, while the oxygen-containing gas is introduced into that zone approximately horizontally. However, such a concept is possible only in calcinators through which the exhaust gases of the sintering combustion zone do not flow.

From DE 10 2004 009 689 A1 there is also known a thermal decomposition reactor for the production of a fuel gas from solid fuels, which reactor comprises a conveyor device, arranged in the decomposition reactor, which moves the fuel in a translational manner from the intake opening to the discharge opening. The conveyor device is formed, for example, by moving plate segments, by a drag-chain conveyor or by reciprocating slats. The dwell time of the fuel in the decomposition chamber can be adjusted in a targeted manner by the conveyor device. However, the high temperatures in the decomposition reactor require a heat-resistant design of the conveyor device.

In DE 27 02 048, the additional combustion region is in the form of a moving-bed combustion device, a travelling grate-type preheater and a gas suspension preheater. The travelling grate-type preheater and the moving-bed combustion device comprise a conveyor device provided within the firing region. A fuel bed is not provided in the case of a gas suspension preheater.

In DE 34 11 144, the additional combustion region is formed by a rotary kiln 5. The fuel bed is accordingly moved by contact with the rotating inside wall.

In AT 368 478, a fluidised-bed or moving-bed combustion plant or a grate-type refuse combustion plant is mentioned for the additional combustion region. In the case of a fluidised-bed or moving-bed combustion plant, the fuel bed is moved by the supply of air inside the firing region, and in the case of grate firing the fuel bed is located on a travelling grate, on a forward-acting or reverse-acting reciprocating grate or on a roller grate.

The object underlying the invention is to specify a novel concept for the combustion of solid fuels which is inexpensive to carry out and requires a low outlay in terms of maintenance.

That object is achieved according to the invention by the features of claims 1 and 8.

The plant according to the invention for the production of cement clinker from cement raw meal essentially comprises a preheating zone for preheating the cement raw meal, a calcining zone for precalcining the preheated cement raw meal, a sintering combustion zone for completely burning the precalcined cement raw meal to cement clinker, and a cooling zone for cooling the hot cement clinker. Furthermore, an additional combustion region for producing heat for the production of the cement clinker is provided, which comprises an intake opening for the admission of solid fuels and a discharge opening for the removal of the resulting combustion products, a firing region and at least one conveyor device for transporting the fuel, the firing region being in such a form that the fuel introduced into the firing region forms a fuel bed and means for supplying oxygen-containing gas are so arranged above the fuel bed that the oxygen-containing gas flows over the fuel bed. The conveyor device is provided outside the firing region and is in such a form that it introduces the fuel into the firing region and thereby moves the fuel bed in the direction towards the discharge opening.

In the method according to the invention for the production of cement clinker from cement raw meal, the cement raw meal is preheated in a preheating zone, precalcined in a calcining zone, completely burned in a sintering combustion zone and cooled in a cooling zone. Furthermore, fuels are burned in an additional combustion region, a firing region being used in the additional combustion region, the solid fuel being introduced into the firing region, where it forms a fuel bed over which a supplied oxygen-containing gas flows, the resulting combustion products being removed via a discharge opening and being used in the production of cement clinker. The fuel is supplied by a conveyor device arranged outside the firing region, in such a manner that the fuel bed present is moved in the direction towards the discharge opening.

Further advantages and embodiments of the invention are the subject-matter of the subsidiary claims.

According to a preferred exemplary embodiment, the additional combustion region is in the form of an underfeed furnace. According to a further embodiment, the firing region has a stationary base which is inclined by at least 10° relative to the horizontal and on which the fuel bed is formed.

Furthermore, the firing region can be formed, for example, by a stationary base in stepped form or in trough form. In addition, the firing region can be followed by a burnout region.

The additional combustion region is preferably in the form of a separate combustion chamber, upstream or downstream of which at least one further combustion region can additionally be provided.

Figure 2:
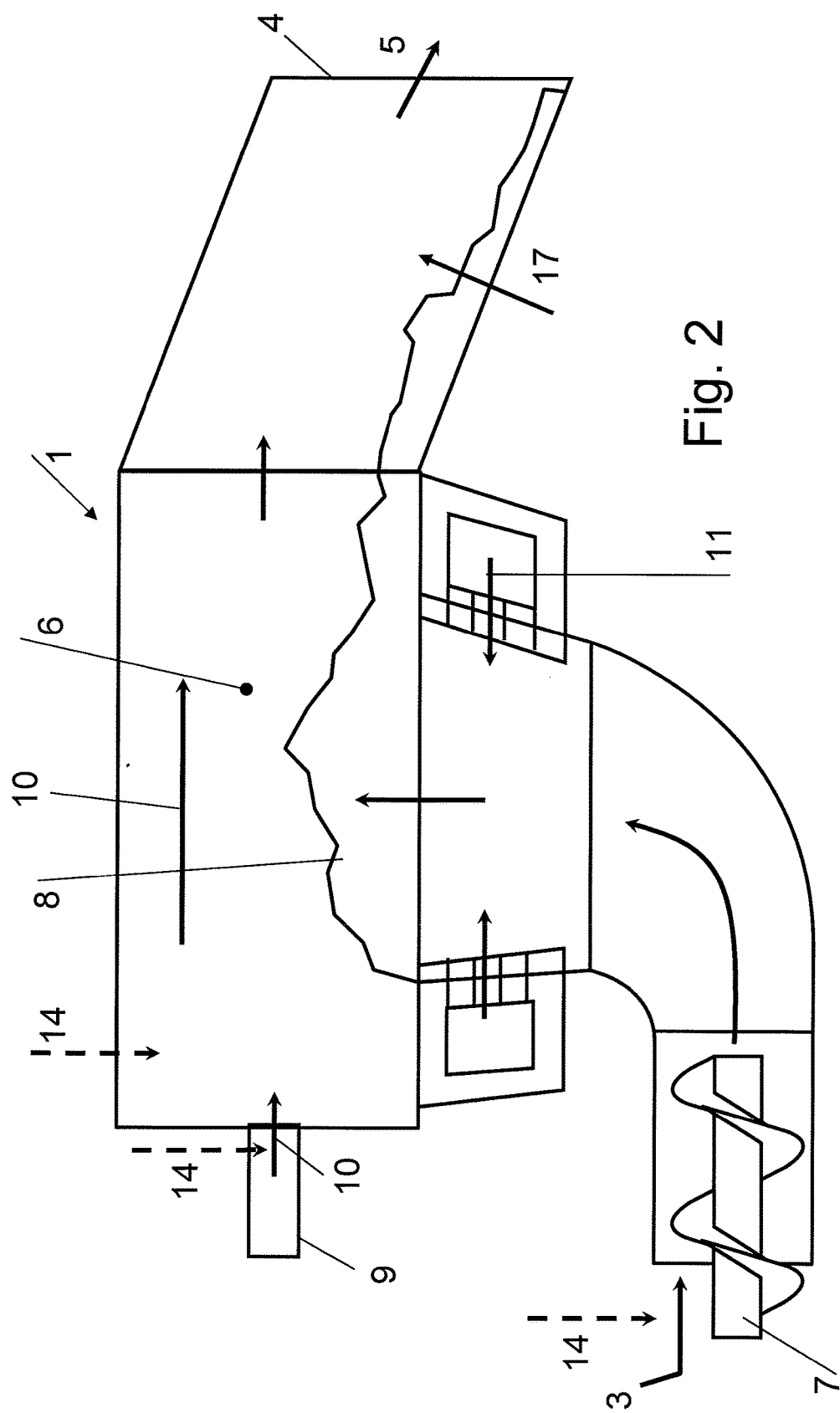
Figure 3:
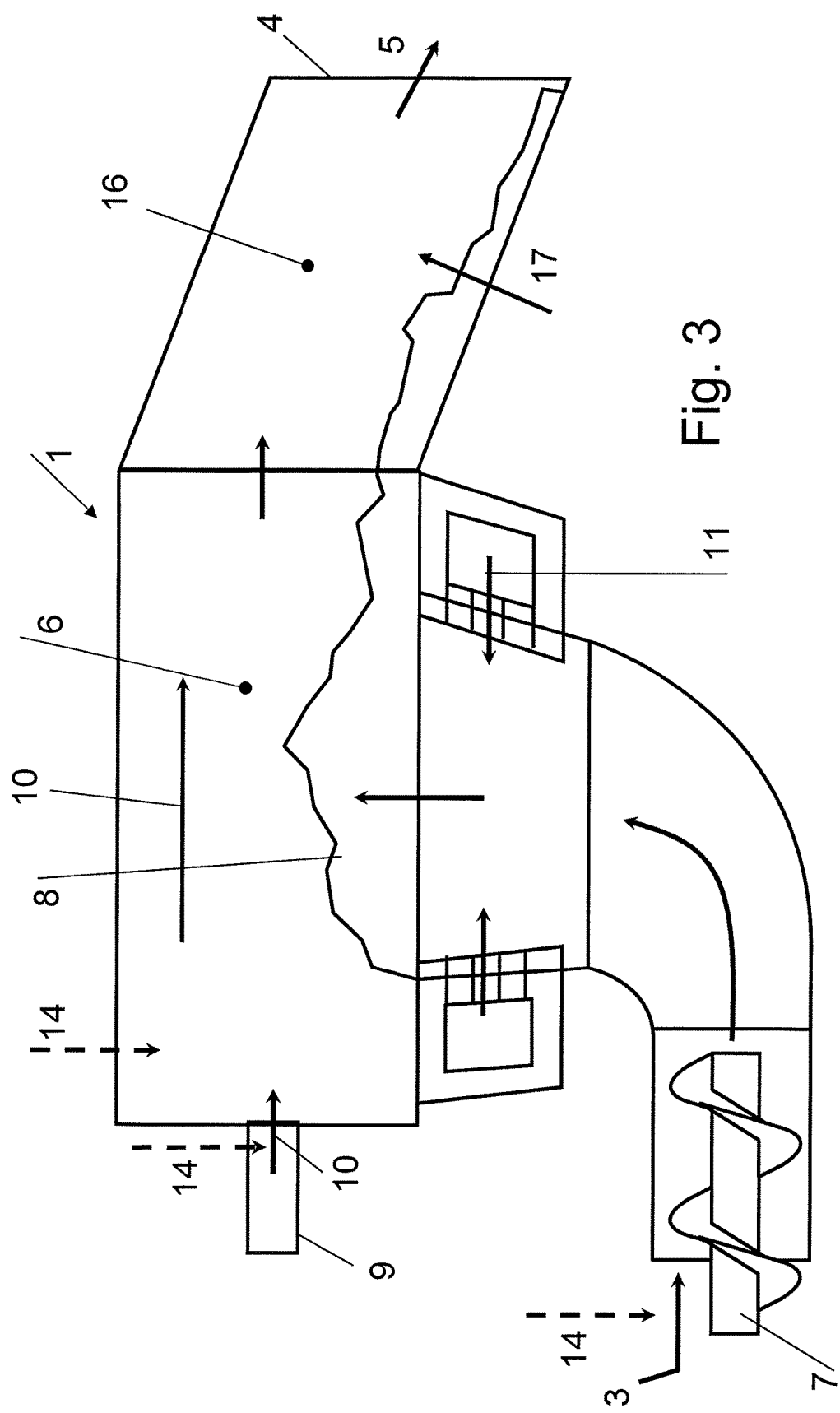

Further advantages and embodiments of the invention are explained in detail hereinbelow by means of the description of some exemplary embodiments and the drawings, in which:

FIG. 1 shows a diagrammatic representation of an additional combustion region according to the invention, FIG. 2 shows a diagrammatic representation of the additional combustion region in the form of an underfeed furnace according to a first exemplary embodiment, FIG. 3 shows a diagrammatic representation of the additional combustion region in the form of an underfeed furnace according to a second exemplary embodiment, FIGS. 4-12 show diagrammatic representations of the plant according to the invention according to various exemplary embodiments.

The additional combustion region 1 shown diagrammatically in FIG. 1 for the production of heat for the production of the cement clinker has an intake opening 2 for the admission of solid fuels 3, a discharge opening 4 for the removal of the resulting combustion products 5, a firing region 6 and also at least one conveyor device 7 for transporting the fuel 3.

The firing region 6 is in such a form that the fuel introduced into the firing region forms a fuel bed 8, and means 9 for supplying oxygen-containing gas 10 are so arranged above the fuel bed that the oxygen-containing gas flows over the fuel bed. The conveyor device 7 is provided outside the firing region 6 and is in such a form that it introduces the fuel 3 into the firing region and thereby moves the fuel bed 8 in the direction towards the discharge opening 4.

Furthermore, the firing region 6 can comprise means 11 for supplying a primary-air-containing gas stream. The primary-air-containing gas stream can be introduced into the fuel bed via the base 12, for example, or alternatively it can be fed to the fuel bed from above. Furthermore, means for the additional feeding in of fuel 13 can be provided in the firing region. It can additionally be advantageous to supply raw meal, partially calcined raw meal or another deactivating material, on their own or in combination, to the firing region 6, to the oxygen-containing gas 10, to the primary-air-containing gas or to the solid fuel via means 14.

In the case of a breakdown or stoppage, the additional combustion region 1 can be filled with raw meal, partially calcined raw meal or another deactivating material via the means 14, in order this to avoid thermal stress on the conveyor device 7 and the formation of a sediment.

In addition, it is possible positively to influence the properties of the solid fuel 3 as a bulk material by the addition of a bulk material conditioning agent, such as, for example, raw meal or sand. A further benefit of the addition of an inert bulk material is that the intensity of the reaction and accordingly the temperature in the firing region 6 can be controlled. The possible sites of addition for the inert bulk material are shown in the drawings by means of broken arrows designated 14. Particularly appropriate are the site above the firing region 6, introduction together with the oxygen-containing gas 10, or introduction together with the solid fuel 3.

The combustion products that are formed are especially exhaust gases and, optionally, combustion residues.

In order to assist the movement of the fuel bed to the discharge opening 4, the stationary base 12 of the firing region 6 can be inclined relative to the horizontal by an angle α of at least 10°.

The additional combustion region 1 shown in FIG. 2 is in the form of an underfeed furnace. There are substantially provided likewise a firing region 6, means 9 for supplying an oxygen-containing gas 10, and a conveyor device 7 for supplying the solid fuel 3. In the exemplary embodiment shown, the fuel 3 is introduced into the firing region from beneath via a conveyor screw, where it forms the fuel bed 8 over which the oxygen-containing gas 10 flows. The conveyor device 7 can be either mechanical or hydraulic or pneumatic. The fuel 3 is introduced into the firing region 6 at least from beneath or laterally, so that the fuel introduced first is also burned first and is not, as in the prior art according to U.S. Pat. No. 5,954,499, covered by fuel introduced subsequently.

The resulting combustion products 5 are removed via the discharge opening 4.

Means 11 for supplying a primary-air-containing gas stream can also be arranged in the firing region 6. In the exemplary embodiment shown, the firing region 6 is additionally followed by a burnout region 16, via the base of which a gas 17 is supplied. Any fuel residues are carried along with hot exhaust gases that form or can be discharged from the bottom in a manner not shown in detail. The burnout region 16 ensures that the fuel fed in can burn out to the greatest possible extent or can burn out to such an extent that final thermal decomposition is to be carried out in the flue stream. The gas 17 supplied from beneath thereby assists the introduction of the material into the flue stream in order thus to ensure the complete thermal utilisation of the material.

While the underfeed stoking according to FIG. 2 is in the form of a retort firing, FIG. 3 shows an exemplary embodiment in which the underfeed stoking has a fire trough.

In the exemplary embodiments shown in FIGS. 1 to 3, the conveyor device 7 is in such a form that it introduces the fuel 3 into the firing region 6 and thereby moves the fuel bed in the direction towards the discharge opening 4. Continuous and/or discontinuous transport of the fuel into the firing region is thereby conceivable. The conveyor device 7 is preferably in such a form that it moves the fuel bed 8 in such a manner that the surface of the fuel bed is regularly broken open so that fresh fuel keeps coming into contact with the oxygen-containing gas 10.

Within the scope of the invention it would also be conceivable for the speed of the supplied oxygen-containing gas 10 to be so chosen that the transport of fuel inside the firing region 6 and/or the supply of fuel takes place pneumatically.

The additional combustion region is advantageously in the form of a separate combustion chamber. In addition, at least one further combustion region can be provided upstream or downstream of the additional combustion region, it also being possible for that further combustion region to be in a different form.

Various exemplary embodiments which show various possibilities for integrating the additional combustion region into a plant for the production of cement clinker from cement raw meal will now be explained briefly hereinbelow. Within the scope of the invention, other embodiments are, of course, conceivable, which are not explained in detail.

In all the exemplary embodiments hereinbelow, the additional combustion region can especially have a form according to one of the exemplary embodiments described in FIGS. 1 to 3.

Figure 4:
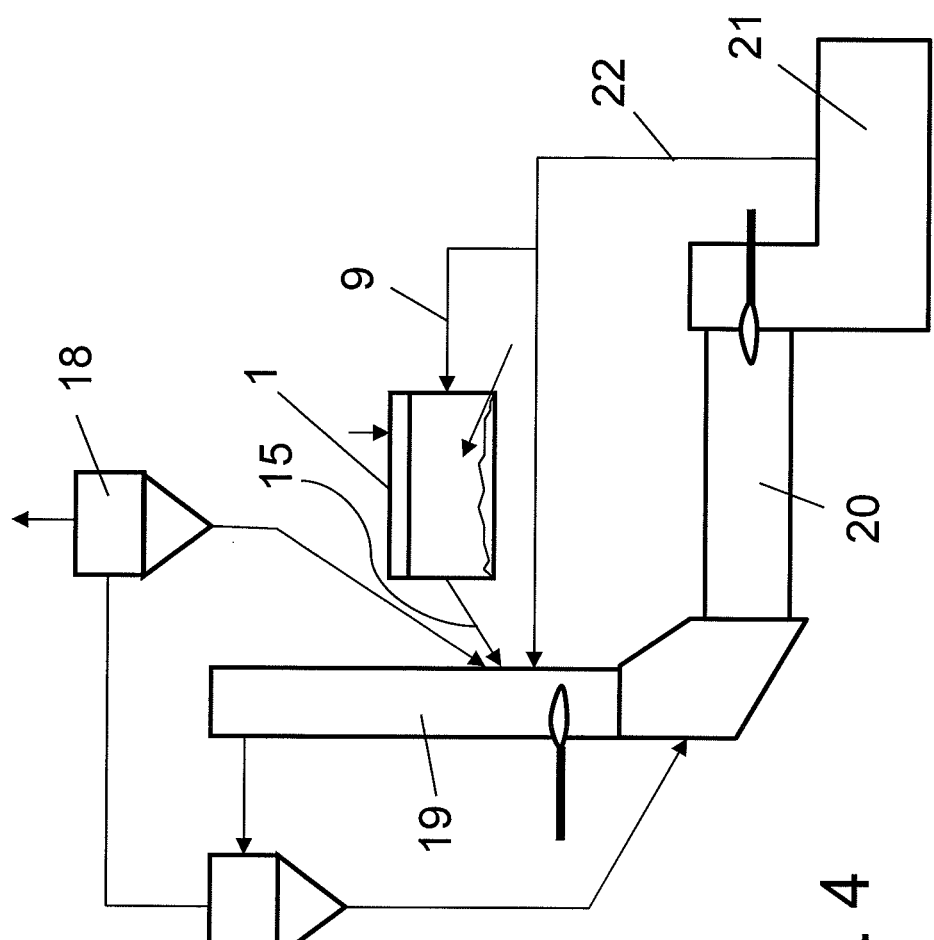

The plant shown in FIG. 4 essentially comprises a preheating zone 18, indicated diagrammatically, for preheating the cement raw meal, a calcining zone 19 for precalcining the raw material, a sintering combustion zone 20 for completely burning the precalcined cement raw meal to cement clinker, and a cooling zone 21 for cooling the hot cement clinker.

The additional combustion region 1 is so arranged that the means 15 for removing the combustion products open directly into the calcining zone 19. The means 9 for supplying oxygen-containing gas to the additional combustion region 1 are formed by a duct that branches from the tertiary air duct 22.

Figure 5:
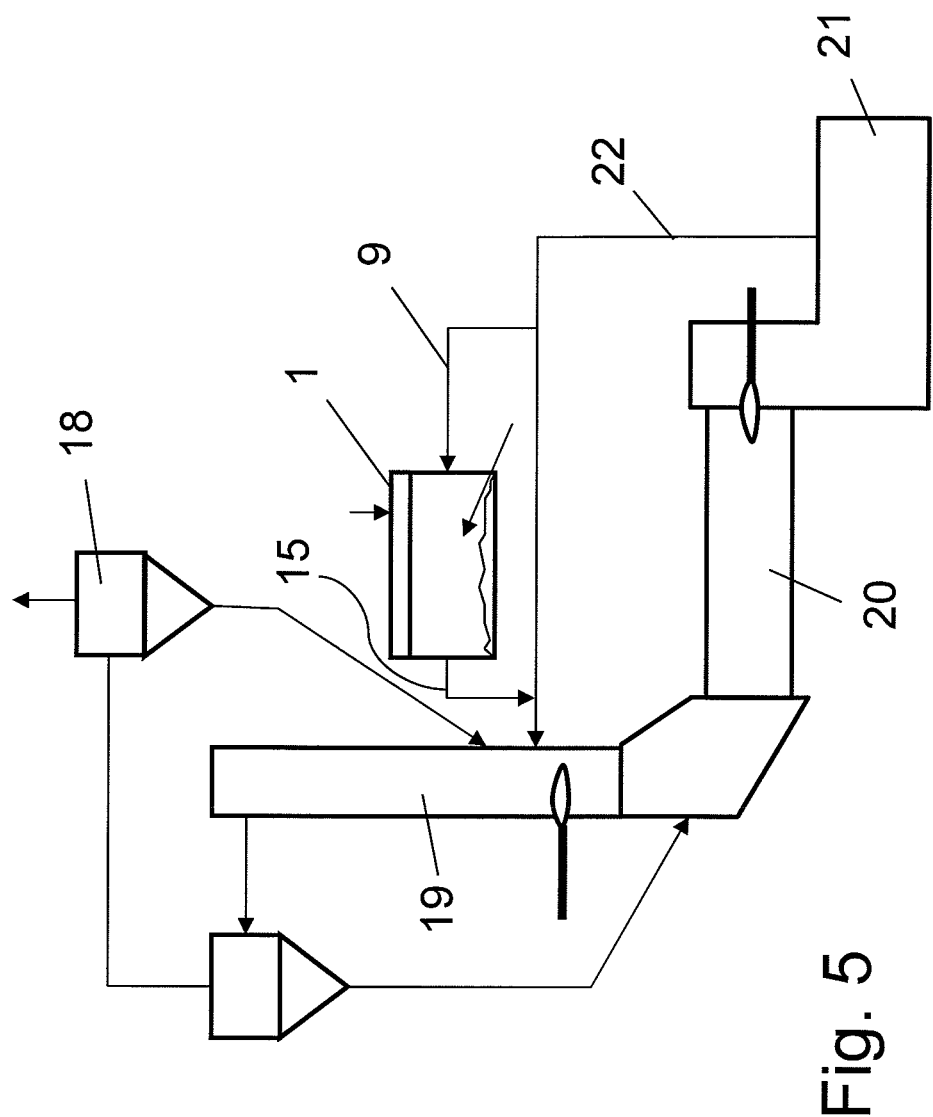

The exemplary embodiment shown in FIG. 5 differs from the preceding exemplary embodiment in that the means 15 for removing the combustion products do not open directly into the calcining zone 19 but into the tertiary air duct 22 leading to the calcining zone 19.

Figure 6:
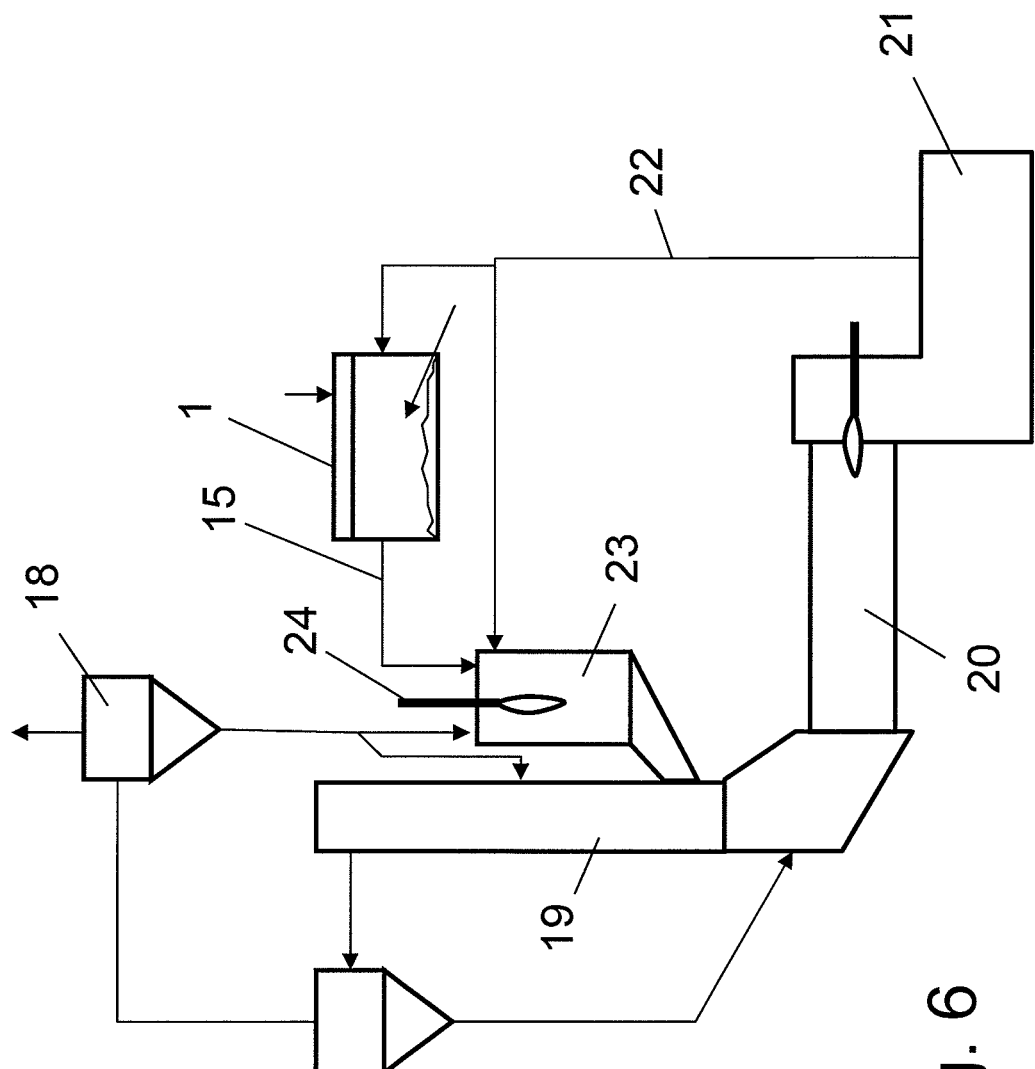

In the plant shown in FIG. 6, the calcining zone 19 additionally also comprises a separate combustion chamber 23 into which there are fed tertiary air, via the tertiary air duct 22, and fuel 24. In contrast to the calcining zone 19, the exhaust gases of the sintering combustion zone 20 do not flow through the separate combustion chamber 23. In addition, at least part of the preheated raw meal can be fed into the separate combustion chamber.

The additional combustion region is so arranged that the means 15 for removing the combustion products are connected to the upper region of the separate combustion chamber 23.

Figure 7:
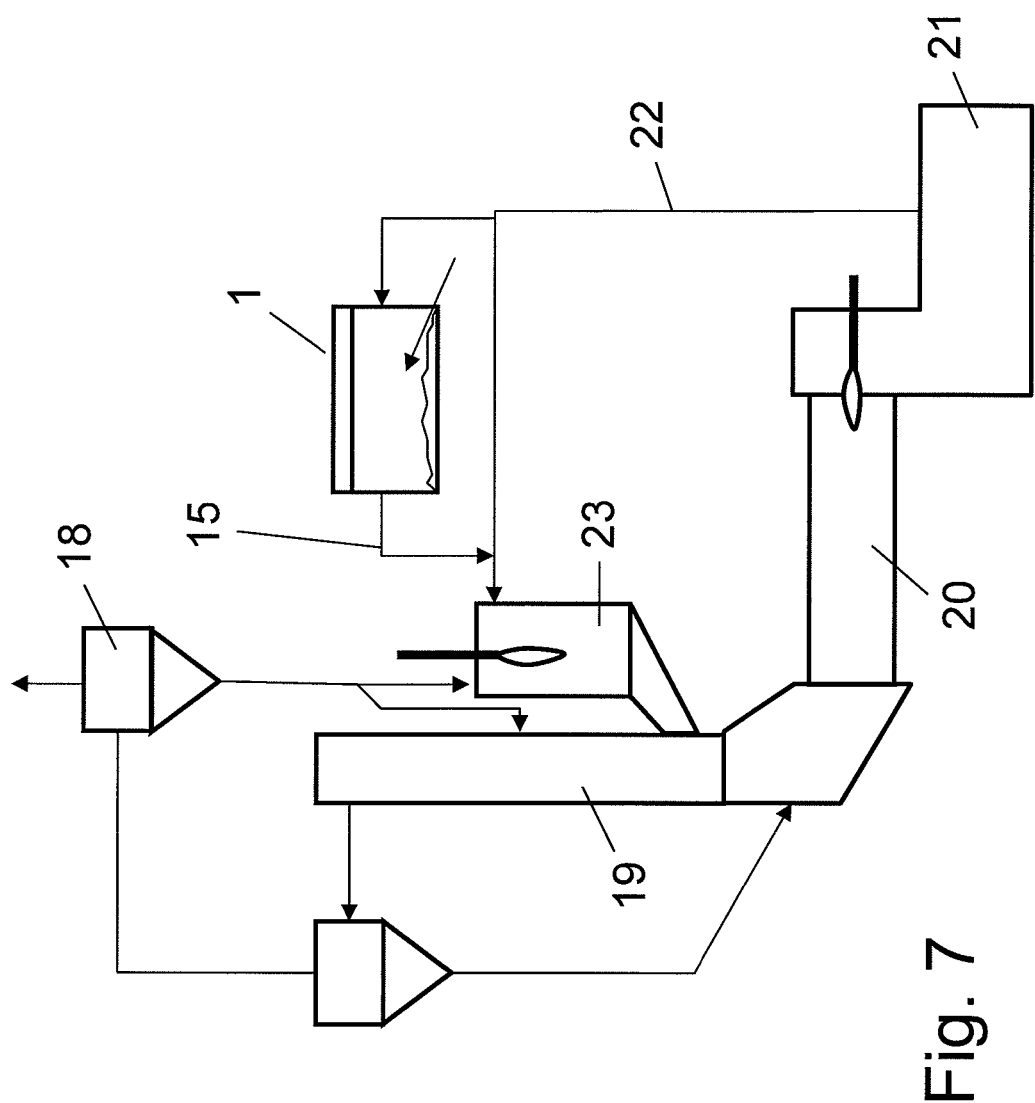

In the exemplary embodiment shown in FIG. 7, the means 15 for removing the combustion products open into the tertiary air duct 22 leading to the separate combustion chamber 23.

Figure 8:
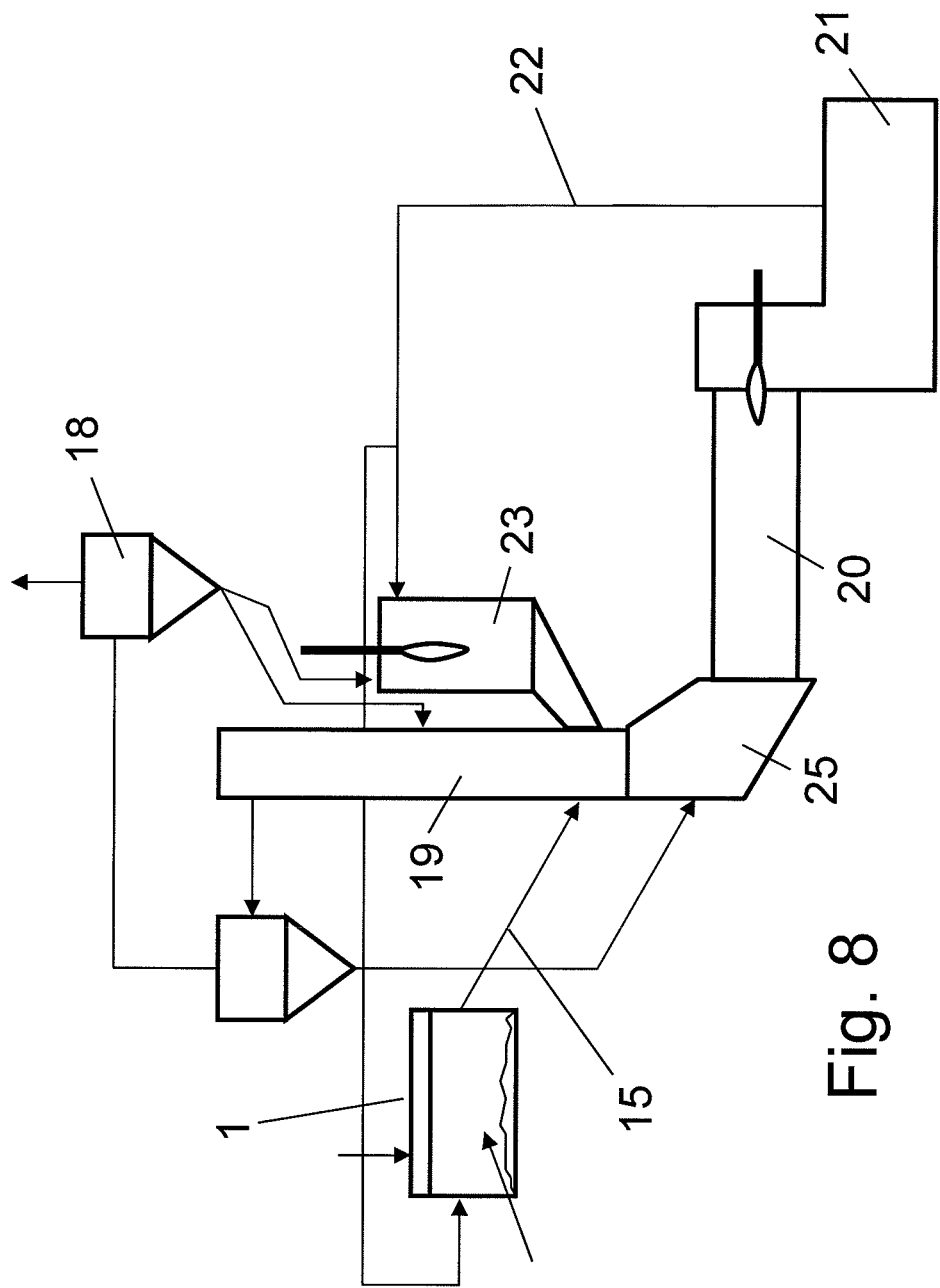

According to the variant shown in FIG. 8, it is also conceivable for the means 15 for removing the combustion products to open not into the separate combustion chamber 23 but into the actual calcining zone 19.

Figure 9:
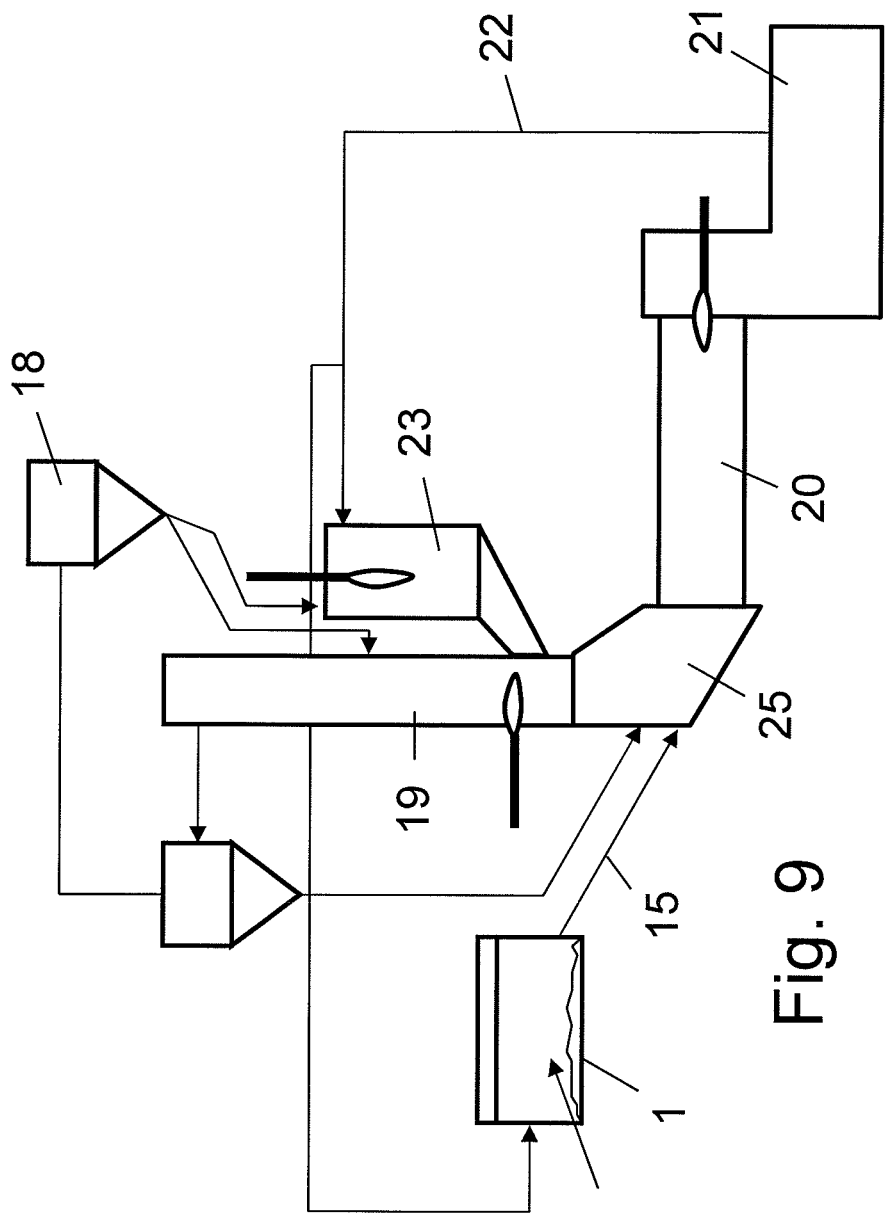
Figure 10:
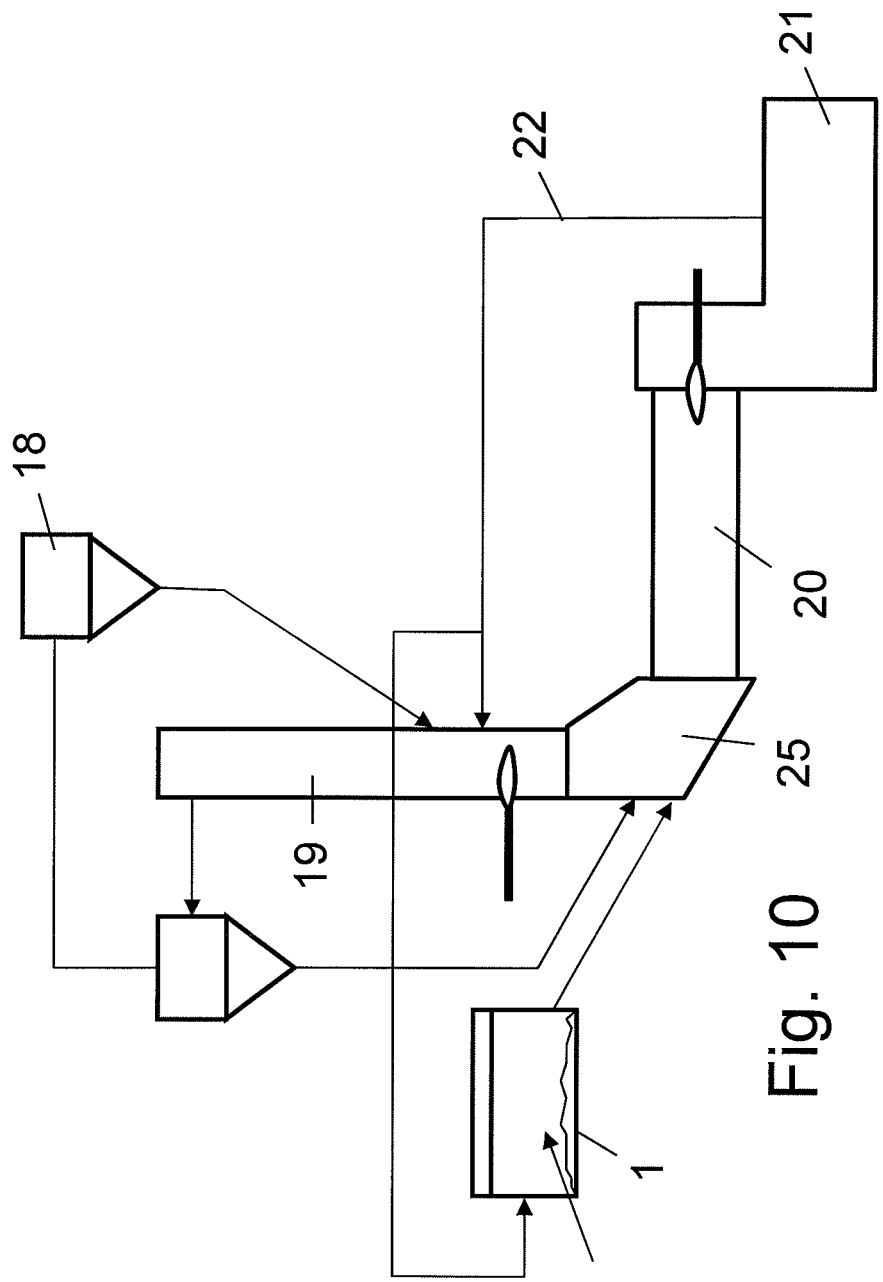
Figure 11:
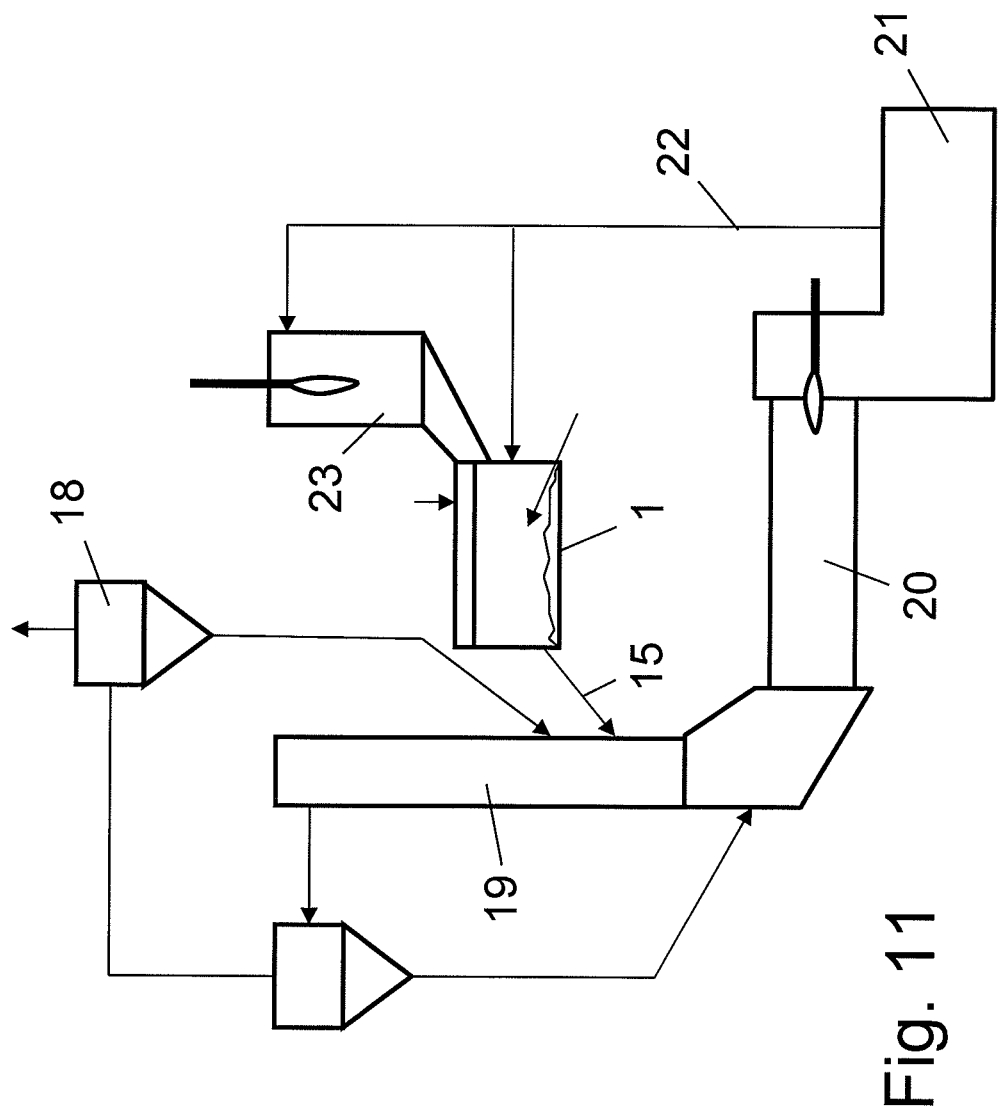

The exemplary embodiments according to FIGS. 9 and 10 show an arrangement of the additional combustion region in which the means 15 for removing the combustion products open into the furnace intake 25 of the sintering combustion zone 20, a calcining zone 19 with a separate combustion chamber 23 being shown in the variant according to FIG. 9 and a calcining zone without a separate combustion chamber being shown in FIG. 10.

While the additional combustion region has been provided upstream of the separate combustion chamber 23 in the exemplary embodiments according to FIGS. 6, 7, 8 and 9, FIG. 11 shows an exemplary embodiment in which the separate combustion chamber 23 is arranged upstream of the additional combustion region. The means 15 for removing the combustion products then open into the actual calcining zone 19.

Figure 12:
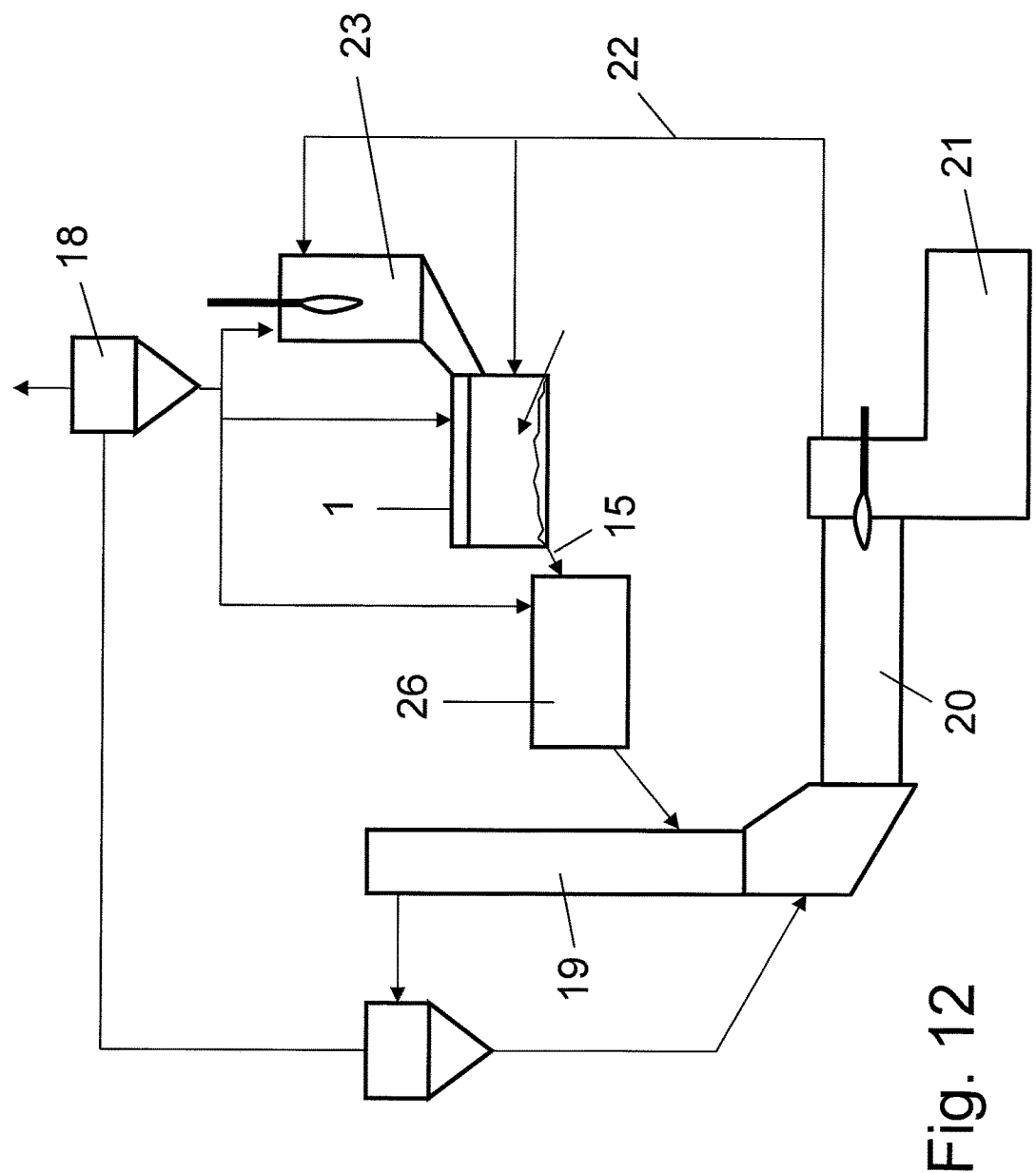

In the exemplary embodiment according to FIG. 12, a further combustion region 26 is provided in addition to the additional combustion region 1 and the separate combustion chamber 23, first the separate combustion chamber 23, then the additional combustion region 1 and finally the further combustion region 26 being arranged in succession, for process-related reasons, the combustion residues being passed into the subsequent stage in each case. The combustion products of the further combustion chamber 26 are then fed to the calcining zone 19. Of course, it would also be conceivable for those three combustion regions to be arranged in a different order. Furthermore, further combustion regions can also be provided.

In the exemplary embodiment shown, part of the preheated raw meal is fed to the separate combustion chamber 23, to the additional combustion chamber 1 and to the further combustion region 26. A further partial amount could also be fed to the calcining zone 19.

The further combustion region 26 can be in the form of, for example, the additional combustion region 1 described above or it can have a different form.

Within the scope of the invention, other configurations are, of course, also possible. A further interesting possibility is especially the provision of a plurality of additional combustion regions in parallel.

The above-described additional combustion region 1 allows the use of solid fuels, especially fuels in pellet form, in the production of cement. Because the combustion conditions and especially the dwell time of the fuel can be adjusted in a targeted manner by the conveyor device 7, it is also possible to use problematic secondary fuels, and the cement works operator then has the possibility of using secondary fuels in lump form, which are considerably less expensive. Furthermore, the additional combustion region is distinguished by a low outlay in terms of maintenance and can be switched off and is cost-neutral in the case of a stoppage or breakdown of the plant.

The additional combustion region is not technically complex and has few moving parts, so that a low investment volume is required for their production and the amortisation time is short.

The invention claimed is:

1. A plant for the production of cement clinker from cement raw meal, the plant comprising:
   a preheating zone for preheating the cement raw meal,
   a calcining zone for precalcining the preheated cement raw meal, the calcining zone in fluid communication with the preheating zone,
   a sintering combustion zone for completely burning the precalcined cement raw meal to cement clinker, the sintering combustion zone in fluid communication with the calcining zone,
   a cooling zone for cooling the hot cement clinker, the cooling, zone in fluid communication with the sintering combustion zone,
   and at least one additional combustion region for producing heat for the production of the cement clinker, the at least one additional combustion region has an intake opening for the admission of solid fuels, a discharge opening for the removal of the resulting combustion products, a firing region, at least one conveyor device for transporting the fuel and means for supplying oxygen-containing gas, the firing region being in such a form that the fuel introduced into the firing region forms a fuel bed and the means for supplying oxygen-containing gas having an inlet into the firing region and arranged above the fuel bed such that oxygen-containing gas flows over the fuel bed,
   the at least one additional combustion region is in the form of an underfeed furnace and the conveyor device is provided outside the firing region and is in such a form that it introduces the fuel into the firing region and thereby moves the fuel bed in the direction towards the discharge opening.

2. The plant according to claim 1, characterized in that the firing region has a stationary base which is inclined relative to the horizontal by at least 10° and on which the fuel bed is formed.

3. The plant according to claim 1, characterized in that the firing region is followed by a burnout region.

4. The plant according to claim 1, characterized in that the means for supplying oxygen-containing gas is connected to the cooling zone and the oxygen-containing gas is tertiary air of the cooling zone.

5. The plant according to claim 1, characterized in that the means for supplying oxygen-containing gas comprises means for adding cement raw meal and/or partially calcined cement raw meal to the oxygen-containing gas.

6. The plant according to claim 1, characterized in that the means for removing the resulting combustion products is connected to the calcining zone, the preheater and/or the sintering zone.

7. The plant according to claim 1, characterized in that the at least one additional combustion region comprises means for supplying cement raw meal and/or partially calcined cement raw meal.

8. The plant according to claim 1, characterized in that means for supplying a primary-air-containing gas stream is provided in the firing region.

9. The plant according to claim 1, characterized in that means for additionally feeding in fuel is provided in the firing region.

10. The plant according to claim 1, characterized in that at least one further combustion region is arranged upstream or downstream of the at least one additional combustion region.

11. A method for the production of cement clinker from cement raw meal, the method comprising:
   preheating the cement raw meal in a preheating zone,
   precalcining the preheated cement raw meal in a calcining zone,
   completely burning the precalcined raw meal in a sintering combustion zone,
   cooling the completely burned raw meal in a cooling zone,
   additionally burning solid fuels in an additional combustion region, the additional combustion zone having a firing region with the solid fuel being introduced into the firing region from beneath in the form of an underfeed furnace where it the solid fuel forms a fuel bed,
   providing a means for supplying oxygen-containing gas with an inlet into the firing region such that supplied oxygen-containing gas flows from the inlet and over the fuel bed, the resulting combustion products being removed via a discharge opening and being used in the production of cement clinker, and
   supplying the fuel via a conveyor device arranged outside the firing region, in such a manner that it moves the fuel bed that is present in the direction towards the discharge opening.

12. The method according to claim 11, characterized in that a conditioning agent, especially cement raw meal, is added to the solid fuel before it is introduced into the additional combustion region.

13. The method according to claim 11, characterized in that the additional combustion region and/or the conveyor device for the fuel are charged with a deactivating material especially during start-up and shut-down of the plant, during a stoppage or in the event of a breakdown.

14. The method according to claim 11, characterized in that the conveyor device moves the fuel bed in such a manner that the surface of the fuel bed is regularly broken open so that fresh fuel comes into contact with the oxygen-containing gas.

15. The method according to claim 11, characterized in that the speed of the supplied oxygen-containing gas is such that the transport of the fuel and/or the supply of fuel takes place pneumatically.

16. The method according to claim 11, characterized in that an underfeed furnace is used for the additional combustion region.

\* \* \* \* \*